United States Patent [19]

Shafer

[11] Patent Number: 4,460,554

[45] Date of Patent: Jul. 17, 1984

[54] METHOD OF REMOVING $H_2S$ FROM A GAS STREAM UTILIZING BORON-VANADIUM, QUINONE SOLUTION AND IRON SCAVAGING COMPOSITION

[75] Inventor: Ronald E. Shafer, Overland Park, Kans.

[73] Assignee: Purtec Systems, Inc., Overland Park, Kans.

[21] Appl. No.: 480,761

[22] Filed: Mar. 31, 1983

[51] Int. Cl.³ .............................................. B01D 53/34
[52] U.S. Cl. .................................... 423/223; 423/224; 423/226; 423/573 R
[58] Field of Search ................ 423/223, 224, 226, 573

[56] References Cited

U.S. PATENT DOCUMENTS

| | | | |
|---|---|---|---|
| 3,035,889 | 5/1962 | Nicklin et al. | 423/226 X |
| 3,097,926 | 7/1963 | Nicklin et al. | 423/573 |
| 4,049,776 | 9/1977 | Nicklin et al. | 423/226 |
| 4,400,361 | 7/1983 | Shafer | 423/226 |

FOREIGN PATENT DOCUMENTS

| | | | |
|---|---|---|---|
| 999799 | 7/1965 | United Kingdom | 423/573 L |
| 999800 | 7/1965 | United Kingdom | 423/573 L |
| 2088839 | 6/1982 | United Kingdom | 423/226 |

OTHER PUBLICATIONS

Nicklin et al., "Hydrogen Sulfide Removal by the Stretford Liquid Purification Process", May 1961.

Primary Examiner—Earl C. Thomas
Attorney, Agent, or Firm—Schmidt, Johnson, Hovey & Williams

[57] ABSTRACT

A process for removing hydrogen sulfide from sour gas streams is disclosed which is carried out in processing equipment which includes steel components resulting in iron from the steel slowly dissolving in the alkaline $H_2S$ absorption medium. The solubilized iron tends to react with the hydrogen sulfide to form iron sulfide which further oxidizes to produce sodium thiosulfate. The preferred absorption medium includes a metal vanadate and boron complex, a quinone type reoxidation catalyst and a metal ferri or ferrocyanide decahydrate compound capable of reacting with the solubilized iron in the alkaline absorption medium to form a precipitate which is unreactive with the dissolved hydrogen sulfide.

12 Claims, 1 Drawing Figure

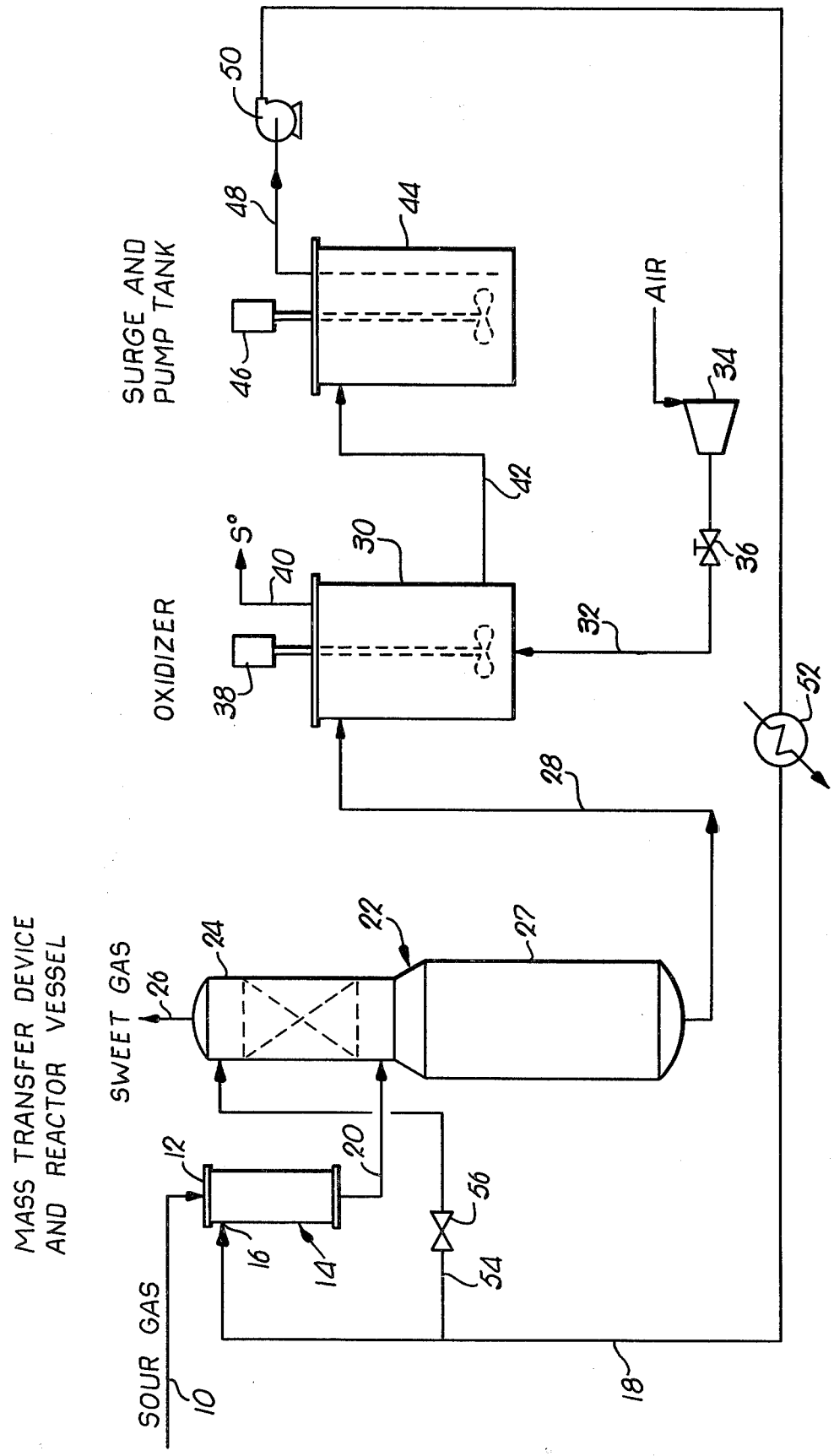

METHOD OF REMOVING H₂S FROM A GAS STREAM UTILIZING BORON-VANADIUM, QUINONE SOLUTION AND IRON SCAVAGING COMPOSITION

This invention relates to a process for removing hydrogen sulfide from sour gas streams wherein the $H_2S$ is converted to elemental sulfur in a liquid absorption medium and the solution is then regenerated for reuse in conjunction with recovery of the free sulfur.

BACKGROUND OF THE INVENTION

A. Related Application

In my related application, Ser. No. 363,647, filed Mar. 30, 1982, entitled METHOD OF REMOVING H₂S FROM A GAS STREAM UTILIZING BORON-VANADIUM AND IRON COMPLEXES, now U.S. Pat. No. 4,400,361, a process is disclosed for removing H₂S from acid gas streams utilizing a liquid absorportion medium containing a vanadium-boron complex and an iron complex catalytic agent prepared by reacting for example ferrous sulfate with a polyamine organic acid such as ethylene diamine tetracetic acid or hydroxyethyl ethylene diamine triacetic acid. The process of that application does not require the use of an anthraquinone disulfonic acid compound as has long been employed in conventional Stretford plants.

B. Prior Art Processes

In the 1960's, Thomas Nicklin and others devised a method for continuous removal of hydrogen sulfide from sour gas streams using an aqueous alkaline absorption solution containing sodium salts of anthraquinone disulfonic acids resulting in the precipitation of elemental sulfur. During this work, it was found that addition of sodium vanadates to the anthraquinone disulfonic acid constituents improved the spread of conversion of hydrogen sulfide to sulfur and increased the hydrosulfide loading of the washing agent. A comprehensive disclosure of the method (referred to as the Stretford Process) is contained in an article by Nicklin and E. Brunner published during the 98th General Meeting of the Institute of Gas Engineers meeting at London, England, May 16–19, 1961.

A number of patents have issued since that time including U.S. Pat. No. 3,035,889 of May 22, 1962 which teaches that when a gas containing hydrogen sulfide is washed with an aqueous alkaline solution of one or more anthraquinone disulfonic acids, the hydrogen sulfide is oxidized liberating free sulfur as the anthraquinone disulfonic acid constituents are reduced. Recovery of the elemental sulfur is disclosed as being feasible in conjunction with reoxidation of the anthraquinone disulfonic acids by passage of an oxygen containing gas therethrough.

In U.S. Pat. No. 3,097,926 of Feb. 16, 1963 Nicklin, et al. suggest that gases containing hydrogen sulfide may be treated to convert the $H_2S$ to elemental sulfur by bringing this sour gas into contact with a liquid alkaline absorption solution containing a metal vanadate such as sodium metavanadate, sodium orthovanadate or sodium ammonium vanadate. In the course of this reaction the vanadate is reduced and the $[HS^-]$ is oxidized to free sulfur. In U.S. Pat. No. 3,097,926, it is also suggested that a chelating or sequestering agent such as sodium potassium tartrate or other soluble tartrate or tartaric acid or ethylene diamine tetracetic acid (EDTA) may be included with the vanadate to enhance the solubility of the vanadate in the presence of $[HS^-]$. It is further indicated that iron salts such as ferrous sulfate or ferric chloride or salts of copper, manganese, chromium, nickel and cobalt may be incorporated in the solution in conjunction with a chelating agent such as EDTA or one of its derivatives, a tartrate or tartaric acid to enhance oxidation of the reduced vanadate during regeneration of the solution.

In U.S. Pat. No. 4,049,776 of Sept. 20, 1977, Nicklin, et al. suggest preparing a ferric ion sulfonated hydroxyl anthraquinone disulfonic acid complex at a pH below 5 and then adding this mixture to the main body of a vanadium-anthraquinone disulfonic acid system thereby precluding precipitation of iron hydroxide in the absorption medium.

Humphreys & Glassgow Limited received U.K. Pat. Nos. 999,799 and 999,800 of July 28, 1965 describing a process for removal of hydrogen sulfide from sour gas in which the gas is washed with a solution of chelated iron of such nature that it is able to exist dissolved in the solution in both the ferric and ferrous states. Thus, the ferric ion upon reaction with $H_2S$ is reduced to the ferrous state as the hydrosulfide is oxidized to elemental sulfur. The ferrous iron may then be oxidized back to the ferric state using an agent such as air. Exemplary chelating agents for the iron include a number of amino acids preferably of the ethylene or trimethylene group.

C. Advantages and Limitations of Stretford Process

The Stretford process has met with substantial commercial success with over eighty plants having been built on a world-wide basis. Pollution abatement in a wide number of industries has been one controlling factor in its adoption and continuing use, particularly where relatively stringent environmental regulations must be met. Features of the process which resulted in its widespread adoption included: removal of high levels of hydrogen sulfide even when the inlet stream was at a relatively low pressure; selective removal of hydrogen sulfide; high turn-down operation; simple analytical testing with minimal technical supervision; rapid start-ups and shut-downs; the processing equipment could be constructed primarily of mild steel; and the sulfur recovered was generally of salable quality.

In spite of these attributes, many organizations faced with the necessity of treating a sour gas to remove hydrogen sulfide therefrom have sought alternate procedures to the Stretford process, especially in recent years. Today, the Stretford process is employed only if no other hydrogen sulfide removal method will reduce the sulfur content of the gas to an acceptable level. The primary reason for this avoidance of the Stretford process if at all possible has been its relatively high operating costs because of loss of chemicals. The absorption solution used in a typical Stretford process has been found to be relatively unstable over prolonged periods of time and make-up expenses are often times totally exorbitant. In addition, sulfur fixation rates have been found to be much higher than anticipated rendering overall process economics even more subject to fluctuations in the cost of chemicals. The instability of Stretford solutions has caused many users to discard their entire inventory of solution and recharge the system. Because of the solution's toxic nature, this has resulted in numerous problems of disposal for owners of Stretford plants.

As pointed out in my prior application, Ser. No. 363,647, Stretford oxidation kinetics have been found to be non-homogenous, first order reactions. The reaction rate is somewhat influenced by increases in oxygen pressure. As a result, it as concluded that the oxidation of Stretford solution is reaction rate controlled rather than a function of mass transfer. Tests conducted to determine the oxidation rates of 2,7 anthraquinone disulfonic acid (ADA) in solutions without vanadium sequestrants established that the oxidation rate increased with the addition of ADA up to a concentration level of 1.3 to 1.5 grams per liter. Increases in ADA concentration to 10 grams per liter resulted in no increase in oxidation rate. Another series of tests conducted using vanadium sequestrants showed that the addition of these sequestrants was found to slow the oxidation rate and change the reaction mechanism to homogenous first order. Variation of ADA concentration from 1 to 10 grams per liter was found to affect oxidation kinetics by linear relationship throughout the entire range of concentrations.

Some of the $H_2S$ removed from sour gas by a Stretford unit is converted to sodium thiosulfate and sodium sulfate (both soluble salts) rather than elemental sulfur. These salts accumulate in the solution. Consequently, in commercial Stretford treatment plants, the alkaline absorption solution must be regularly purged to avoid precipitation of the least soluble components. This purge requirement is a major factor affecting Stretford chemical and operating costs.

Production of soluble salts is believed to proceed through three reaction paths: 1. Oxidation of bisulfide producing sodium thiosulfate

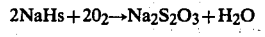
$2NaHs + 2O_2 \rightarrow Na_2S_2O_3 + H_2O$

2. Formation of sodium thiosulfate by alkaline hydrolysis of elemental sulfur suspended in solution

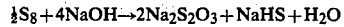
$\tfrac{1}{2}S_8 + 4NaOH \rightarrow 2Na_2S_2O_3 + NaHS + H_2O$

This reaction is accelerated at elevated temperatures and high solution pH.

3. Metabolic oxidation of sodium thiosulfate to sodium sulfate by Thiobacillus bacteria. The path is initiated by certain trace elements in the system. Thiobacillus are facultative bacteria, consequently, are capable of growing with or without oxygen.

D. The Process of My Application Ser. No. 363,647

Hydrogen sulfide is removed from sour gas streams by bringing the sour gas into $H_2S$ absorbing relationship with a liquid alkaline absorption medium containing a vanadium-boron complex sequestrant capable of oxidizing hydrosulfide in the solution to elemental sulfur as the vanadium undergoes reduction while the boron constituent functioned to inhibit formation of insoluble vanadium sulfide compounds. The solution is regenerated by reoxidizing the reduced vanadium with an oxygen-containing gas in the presence of a reoxidation catalyst without deleteriously affecting recoverability of free sulfur from the absorption medium.

The reoxidation catalyst comprises an iron chelate prepared by combining an iron compound with a polyamine organic acid such as hydroxyethyl ethylene diamine triacetic acid or ethylene diamine tetracetic acid. The sour gas stream is passed on cocurrent flow relationship to the absorption solution in a first absorption zone and then the solution is regenerated in a second, separate zone using an oxidizing medium such as air or pure oxygen. Sulfur-free gas goes overhead from the absorption zone; elemental sulfur is recovered from the oxidizing zone. ADA is not used as a constituent part of this process.

SUMMARY OF THE PRESENT INVENTION

For certain processing applications, it has now been found that enhanced sulfur recovery from acid gas streams may be accomplished using an alkaline absorption medium containing a vanadium-boron complex, a quinone type reoxidation catalyst having hydroxy or keto groups on the 1 and 4 positions of the aromatic ring structure, and a metal ferri or ferrocyanide hydrate that is capable of reacting with solubilized iron which enters the abdsorption medium from the steel components of the processing equipment.

Absorption and conversion of hydrogen sulfide to elemental sulfur is believed to occur in the following manner:

1. Reduction—

$$2V(OH)_4^{++} + 3H^+ + HS^- \rightarrow 2V(OH)_2^{++} + 4H_2O + S^o$$

2. Oxidation—

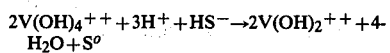
$$4V(OH)_2^{++} + 6H_2O + O_2 \xrightarrow{\text{(catalyst)}} 4V(OH)_4^+ + 4H^+$$

3. Overall reaction—

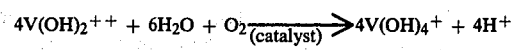
$$H_2S + \tfrac{1}{2}O_2 \rightarrow S^o + H_2O$$

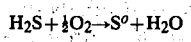
Vanadium is the primary oxidation-reduction couple in the present process which converts the $H_2S$ in the sour gas stream to sulfur. As a result, vanadium should be present in at least stoichiometric quantities, i.e. two moles of elemental vanadium per mole of hydrogen sulfide absorbed. Since the overall reaction of equation #3 does not proceed stoichiometrically, it has been found necessary to inhibit the formation of undesirable side reactions which would produce an intermediate vanadium sulfide or a $V^{+3}$ reduction product. This is accomplished by provision of a boron compound which complexes with the vanadium. The boron compound combined with the vanadium should be present in an amount to provide from 1 mole boron to 1 mole vanadium to 6 moles boron to 1 mole vanadium. Boron also serves as a buffer to maintain the system at an optimum pH in the range of 8.5 to 9.3.

A quinone having a hydroxy or keto group at the 1 and 4 positions of the aromatic ring structure is provided as an oxidation catalyst. From 100 ppm to 6000 ppm of the quinone type catalyst should be provided.

Since processing equipment conventionally and desirably from a costs standpoint includes carbon steel components, iron from such components dissolves in the alkaline absorption medium, particularly in those sections of the plant exposed to vanadate in the $V^{+4}$ form which is more corrosive than the $V^{+3}$ state.

It has now been discovered that solubilized iron from the steel components of the processing equipment (which may be in the form of iron hydroxides or complex iron species) may be inhibited from reacting with hydrogen sulfide to form iron sulfide which then oxidizes to produce sodium thiosulfate by inclusion of from 50 to 2000 ppm and preferably 50 to 200 ppm of an alkali metal salt of a ferri or ferrocyanide hydrate which is capable of reacting with the solubilized iron in the absorption medium to produce an essentially insoluble precipitate.

It is therefore, a primary object of the invention to provide a process for recovering elemental sulfur from a sour gas stream containing H₂S using equipment having steel components wherein the reduction-oxidation couple is vanadium complexed with a boron side reaction inhibitor along with a quinone oxidation catalyst, and formation of iron sulfide from iron dissolved in the absorption solution is precluded by the use of an iron cyanide compound capable of reacting with the dissolved iron to produce an insoluble precipitate.

DRAWING

The single FIGURE is a schematic representation in simplified form of equipment useful for carrying out the process of this invention which includes steel components and involving a mass transfer and reactor reduction zone followed by an oxidizer. The alkaline absorption medium undergoes reduction in the first zone as elemental sulfur is produced without formation of insoluble vanadium sulfide compounds and the vanadium is then reoxidized in the oxidizer with sulfur going overhead as a froth.

DETAILED DESCRIPTION OF THE INVENTION

Sour gas to be treated and containing hydrogen sulfide is introduced into the treatment process via line 10. The gas stream may for example be natural gas containing H₂S and CO₂ along with other gaseous constituents, or it may be principally methane along with hydrogen sulfide and very little else. Other gas streams that may be treated in accordance with principles of this invention include refinery off gas both containing significant levels of hydrogen sulfide, or other similar H₂S containing gases. The sour gas is introduced into one end 12 of an enhanced mass transfer mixing device 14 which also has an inlet 16 for regenerated liquid absorption solution supplied thereto via line 18. Device 14 preferably is a long tubular member having a series of stationary angularly located blades therein which causes the fluid flowing therethrough to follow a spiral swirl path for intimate admixing of gas and liquids furnished to the device. It is to be noted from the drawing that the flow of sour gas and regenerated absorption liquid through device 14 is in cocurrent relationship such that the fluids leave the unit 14 through common effluent line 20.

A packed column and separator vessel 22 is downstream from mass transfer device 14 whereby the influent to the packed column section 24 of vessel 22 enters at the lower part thereof. Sweet gas separated from the absorption medium is therefore allowed to go overhead through outlet line 26 while the liquid absorption medium collects in separator section 27. The liquid underflow from vessel 22 is directed via line 28 into the upper end of oxidizer tank 30.

A source of oxygen is connected to the lower end of tank 30 and may take the form of a line 32 leading to a source of air or pure oxygen and having a compressor 34 therein as well as a selectively controllable supply valve 36. Means to mechanically agitate the solution in tank 30 to assure intimate contact between the air and the liquid may take a number of forms with a mechanical stirrer 38 being illustrated for exemplary purposes only. Sulfur froth is removed from tank 30 via line 40 while the reoxidized liquid absorption medium is removed from the bottom of tank 30 and conveyed via line 42 to a combination surge and pump tank 44 and also optionally provided with a stirring device such as the mechanical stirrer 46 schematically illustrated in the drawing. The output line 48 from surge tank 44 has a pump 50 therein and leads to the inlet of a heat exchanger 52. The outlet of exchanger 52 is joined to supply line 18 communicating with the inlet of the mass transfer device 14. Either cooling water or a heating fluid such as steam may be passed through one side of the heat exchanger 52 to control the temperature of the liquid absorption medium returned to device 14 via line 18 depending upon the operating conditions established for a particular process.

As an alternate method of operating the process, part of the reoxidized absorption medium recycled from oxidizer 44 may be directed via line 54 into the top of vessel 22 for countercurrent contact with the gas in the packed section 24. Valve 56 in line 54 allows selective control over partial diversion of the absorption medium or total direction of the absorption agent to mixer 14 for cocurrent contact with the gas.

As briefly indicated above, the liquid alkaline absorption medium employed in the sulfur oxidation process of this invention preferably includes a boron complex of vanadate ion. The ratio of elemental boron to elemental vanadium on a mole basis is from about 1:1 to about 6:1 although the ideal composition contains from about 4.2 to 4.8 boron to 1 vanadium mole ratio. The most preferred ratio is 4.4 moles of boron to 1 mole of vanadium. Generally, the vanadium concentration of the metal should be in the range of 0.5 to 10 grams per liter. The complex may be prepared by the use of vanadium pentoxide, or by monovalent cation vanadates such as sodium, potassium, ammonium or sodium ammonium vanadate dissolved in aqueous solutions of alkaline metal salts such as sodium carbonate. These alkaline metal salts also have the function of acting as a buffer in the overall absorption solution. The borate may be added as boric acid or monovalent cation borates such as sodium borate, ammonium borate, potassium borate or alkali metal salts of tetraborate or metaborate. Borax may also be used in preparing the vanadium-boron complex. Complexing of the vanadate ion with a boron compound has been found to effectively inhibit undesirable side reactions involving the formation of intermediate sulfur or $V^{+3}$ reduction product, thus extending the life of the absorption solution. If such side reactions were allowed to occur, sodium thiosulfate would be formed which accumulates in the absorption medium eventually requiring purging of the solution. Purging is the major cost in operating the sulfur recovery system.

Assuming that sodium metavanadate is used in combination with the boron compound in preparing the absorption solution, it has been determined that preferably there should be from 1.54 to 30 grams per liter as vanadium of sodium vanadate based on a solution loading of 500 parts per million hydrosulfide. Similarly, if boric acid is combined with the sodium vanadate, ideally 10 grams per liter as boron of $H_3BO_3$ should be added. The sodium carbonate in the solution maintains the pH thereof at the desired level of about 8.5 to about 9.3 and provides the alkaline solution for initial absorption of $H_2S$ and formation of hydrosulfide ($H_2S + Na_2CO_3 \rightarrow Na^+ HS^- + NaHCO_3$). The amount of sodium carbonate in the solution can range from about 0.05 mole to approximately 0.5 mole, i.e. 5 grams per liter to 53 grams per liter. The preferred parameter is about 10 grams of sodium carbonate per liter of solution. Boron also assists in maintaining solution pH at the optimum range of 8.5 to 9.5 without carbon dioxide being present in the feed gas.

Reoxidation of reduced vanadate requires the use of an oxidation catalyst. The 2,6 and 2,7 isomers of anthraquinone disulfonic acid have been used in commercial Stretford sulfur recovery processes. Although such isomers have utility in the present process, it has now been discovered that more fundamental quinones, such as hydroquinone, are more effective catalysts than the 2,6 and 2,7 isomers of anthraquinone disulfonic acid. The catalytic property is believed to be a function of the position of the oxygen molecule on the central aromatic ring.

Examples:

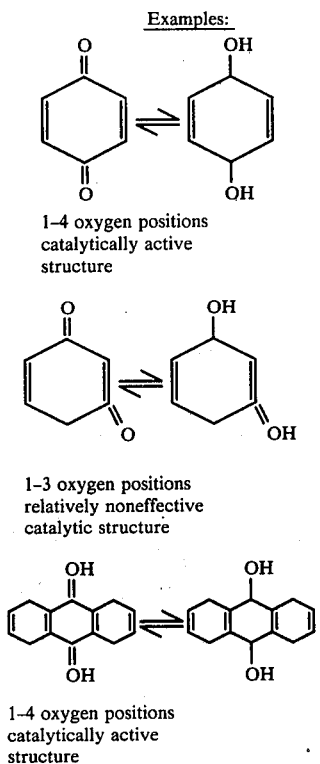

(I) 1-4 oxygen positions catalytically active structure (II) 1-3 oxygen positions relatively noneffective catalytic structure (III) 1-4 oxygen positions catalytically active structure (The position of the sulfonic acid on the ring has little if any effect on catalytic properties.)

Test results of experiments examining quinone catalytic activity are as follows:

TABLE I

| | Oxidation Kinetics Data Summary | |
|---|---|---|
| Run No. | Catalyst grams/liter | Oxidation Rate Constant (K)* |
| 133 | 1.0 g/l 1,3 dihydroxy quinone | −0.025/min. |
| 154 | 3.0 g/l 2,7 ADA | −0.091/min. |
| 155 | 3.0 g/l 2,6 ADA | −0.096/min. |
| 160 | 0.5 g/l 1,4 dihydroxy quinone | −0.147/min. |

*The larger the absolute value of K, the more effective the compound as an oxidation catalyst.

The present process preferably employs quinone as an oxidation catalyst where the quinone contains hydroxy or keto structures on the same ring with two carbon atoms separating the groups. The concentration range for 1,4 hydroquinone is preferably from about 50 ppm to about 3000 ppm. The anthraquinones (2,6 and 2,7 isomers of anthraquinone disulfonic acid) should be in concentrations of from about 500 ppm to about 6000 ppm. Quinone type catalyst concentration ranges are for the most part dependent upon physical design of the oxidizing equipment. Exemplary 2,6 or 2,7 ADA concentrations would be from 0.5 to 10 grams per liter and preferably about 0.5 to 1.5 grams per liter of solution. It has also been found advantageous in certain instances to use the combination of 1,4 dihydroxyquinoline and either the 2,6 or 2,7 isomer or anthraquinone or both of such isomers with the 1,4 dihydroxyquinoline. In most instances, equal proportions of the ADA type quinone and the 1,4 dihydroxyquinoline may be used.

Sodium vanadate functions as a corrosion inhibitor while in the pentavalent state; however, it is relatively ineffective as a corrosion inhibitor in its reduced state. Areas where sulfur deposition occurs can produce corrosive environments since the vanadate will convert to the $V^{+4}$ form.

As previously indicated, iron in solution as metal hydroxides or complex metal species can form iron sulfide when contacted with hydrogen sulfide. Internally, the iron sulfide when contacted with air in the oxidation zone will produce soluble sulfur salts.

Free iron in the absorption solution has a negative effect on overall raction stiochiometry. Ferrous ions react with $H_2S$ to form iron sulfide which is then oxidized to sodium thiosulfate which contaminates the solution requiring frequent purging. That the use of iron cyanide additive to the solution solves the problem of an adverse effect of free iron on reaction stiochiometry is demonstrated by the following tests. Hydrogen sulfide in each instance was injected into a reactor bottle containing a known quantity of an absorption solution of a composition as recorded in Table II. The atmosphere of the bottle above the solution was purged with nitrogen and the same amount of hydrogen sulfide introduced into the bottle for each test cycle. The solution as heated and agitated for a period of 10 minutes. Then a known quantity of $O_2$ was injected in each test bottle. The $O_2$ content of each test solution in the bottle was analyzed after withdrawl from the bottles using a gas tight syringe employing gas chromotographic apparatus. From a stoichiometric standpoint, 0.5 mole of $O_2$ should be consumed for each 1 mole of $H_2S$ introduced into the absorption, taking into account the influence of water vapor pressure.

TABLE II

| Run 1 | | |
|---|---|---|
| Composition of absorption solution-millimole/liter | | |
| $NaVO_3$ | 6.96 | |
| $H_3BO_3$ | 33.40 | pH adjusted to 8.8 |
| $FeSO_4.7H_2O$ | 0.00 | Temperature of solution 41° C. |
| $Na_2Fe(CN)_6.10H_2O$ | 0.00 | |
| Percent of theoretical stoichiometric oxygen consumption - 98.55 | | |
| Run 2 | | |
| Composition of absorption solution-millimole/liter | | |
| $NaVO_3$ | 6.96 | pH adjusted to 8.8 |
| $H_3BO_3$ | 33.40 | Temperature of solution 41° C. |
| $FeSO_4.7H_2O$ | 0.357 | (=20 ppm Fe) |
| $Na_2Fe(CN)_6.10H_2O$ | 0.000 | |
| Percent of theortetical stoichiometric oxygen consumption - 111.88 | | |
| Run 3 | | |
| Composition of absorption solution-millimole/liter | | |
| $NaVO_3$ | 6.96 | pH adjusted to 8.8 |
| $H_3BO_3$ | 33.40 | Temperature of solution 41° C. |

TABLE II-continued

| | | |
|---|---|---|
| FeSO$_4$.7H$_2$O | 0.357 | (=20 ppm) |
| Na$_2$Fe(CN)$_6$.10H$_2$O | 0.537 | (=530 ppm) |
| Percent of theoretical stoichiometric oxygen consumption - 103.47 | | |

The studies confirm that although the boron has utility for complexing vanadium and preventing undesirable side reactions involving the vanadium ions, the boron has no value in preventing formation of thiosulfates via free iron in the solution as had previously been suggested and advanced in prior art processes. It was unexpectedly discovered that the addition of an iron cyanide and particularly Na$_2$Fe(CN)$_6$.10H$_2$O, the oxygen consumption was approximately that of the theoretical stoichiometric value therefor.

A second reaction path is the production of persulfate or peroxide which is capable of oxidizing organic catalyst. Since iron from the steel components of the processing equipment will dissolve to a limited extent on a continuous basis, there is always a quantity of iron in the alkaline absorption solution derived from the processing components themselves unless effective steps are taken to neutralize the adverse effect of such dissolved iron. For example, if the solution in a plant has an iron concentration of 50 ppm as suspended hydroxide or weak complexes, the production rate of unwanted sulfur salts will produce approximately 1.0 grams of soluble sulfur salts per liter of solution per day.

The addition of an alkali metalferro or ferricyanide hydrate salt to the alkaline absorption solution has been found to effectively remove iron from the sulfur recovery system through the formation of a ferric or ferrocyanide precipitate. The solubility product of ferric or the iron salts of ferrocyanide is approximately $10^{-41}$ which means that the free iron content in the alkaline absorption medium is for all practical purposes zero.

The alkali metal salts of ferro or ferricyanide hydrates are soluble in alkaline solutions. As a consequence, adequate quantities of an alkali ferro or ferricyanide hydrate should be added to the alkaline absorption solution on a regularly monitored basis to maintain the [Fe(CN)$_6$]$^{--}$ or [Fe(CN)$_6$]$^{--}$ concentration in a range of about 50 to about 2000 ppm preferably about 100 ppm. It is to be appreciated in this respect that the upper limit of the iron cyanide compound is principally if not entirely a matter of economics rather than an operating limitation. Generally, maintenance of from 0.5 to 1.5 grams per liter of Na$_2$Fe(CN)$_6$.10H$_2$O in the treatment solution will prevent free iron from forming soluble iron sulfide with the deleterious effects previously explained.

Generally speaking, the total residence time of the absorption liquid in the combination of mass transfer device 14 and reactor vessel 22 should be about 10 minutes. In practical effect residence time in mixer 14 per se is generally no more than about 5 seconds. In the same manner, the total residence time of the solution in oxidizer 30 should be approximately 40 minutes.

The presence of the sour gas introduced through line 10 has no significant bearing on the operation of the overall process and may vary for example from as little as atmospheric to as much as 2000 psi. If a substantial amount of carbon dioxide is present in the sour gas causing the stream to have a high CO$_2$ partial pressure, this has a depressing effect on the mass transfer of H$_2$S absorption but does not stop such absorption, it merely depresses the same to a certain extent. The temperature of the incoming gas is also not highly critical although in most instances such gas will be approximately ambient or in the range of 60° F. to about 90° F. Insofar as the absorption solution temperature is concerned, the temperature should be somewhat elevated and generally in the range of about 85° F. to 150° F. The hotter the better in this respect with the primary limiting factor being the cost of heating the solution through the medium of exchanger 52 and increasing thiosulfate formation through sulfur hydrolysis. Best results are obtained if the solution is kept within the range of about 104° F. to approximately 122° F.

The temperature of the air or oxygen supplied to oxidizer 30 through line 32 is also not critical and is generally at ambient or the temperature thereof which results from compression or the same.

In the reduction zone made up of device 14 and reactor vessel 22, the sour gas is contacted with the alkaline aqueous solution containing vanadium-boron complex. Since the H$_2$S is absorbed in the sodium carbonate buffered alkaline conditions of the absorption medium and forms [HS$^-$] ions, the hydrosulfide is oxidized to elemental sulfur and the boron-vanadium complex is reduced in accordance with the following formula:

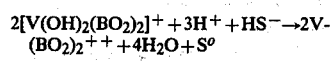

$$2[V(OH)_2(BO_2)_2]^+ + 3H^+ + HS^- \rightarrow 2V-(BO_2)_2^{++} + 4H_2O + S^o$$

The oxidation reaction of the present process may be represented as:

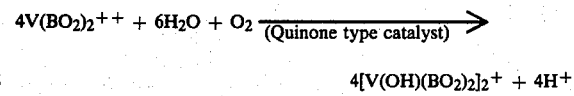

$$4V(BO_2)_2^{++} + 6H_2O + O_2 \xrightarrow{\text{(Quinone type catalyst)}} 4[V(OH)(BO_2)_2]_2^+ + 4H^+$$

This chemistry results in substantially the same overall reaction as represented by formula 3 set forth hereinabove.

In the preferred process, the oxidation zone is operated in a manner such that the effluent thereof is only partially returned to the fully oxidized state. This means that dissolved oxygen in the oxidizer is completely depleted prior to transfer of the solution back to the reduction zone. Oxygen in the reduction zone has the same detrimental effect as sulfide in the oxidation zone. As a result, it is desirable not to effect complete reoxidation of the vanadium-boron complex in the oxidizer prior to return thereof to the mass transfer device 14. In a preferred operation for example, about 90% of the vanadium flowing into the oxidizer 30 through the inlet line 28 has a valence of +4 whereas the V$^{+4}$ content of the liquid leaving the oxidizer through line 42 is about 3%.

I claim:

1. In a method of removing H$_2$S from a sour gas by oxidation of the H$_2$S to free sulfur utilizing equipment which includes steel components, the improved steps of:

contacting the sour gas with a liquid alkaline absorption medium capable of absorbing H$_2$S with at least a part thereof forming [HS$^-$] ions, said liquid absorption medium containing a vanadium-boron complex wherein the ratio of boron to vanadium on an elemental basis is such that the [HS$^-$] ions are oxidized to an extent to produce elemental sulfur as the vanadium undergoes reduction and the boron constituent inhibits formation of insoluble vanadium sulfide compounds and consequent thiosulfate formation upon reoxidation of the vanadium;

providing a quantity of a quinone type oxidation catalyst in said absorption medium which has substituted radicals on the aromatic ring structure threof separated by two carbon atoms and selected from the group consisting of hydroxy and keto;

said oxidation catalyst being present in a concentration sufficient to enhance oxidation of the reduced vanadium;

regenerating the absorption medium utilizing a source of oxygen to oxidize the reduced vanadium; and maintaining a sufficient quantity of an iron cyanide compound in said alkaline absorption medium which is compatible with said vanadium-boron complex and the quinone type catalyst and that is capable of reacting with ionic iron entering the absorption medium from the steel components of said processing equipment to form an essentially insoluble precipitate thereby preventing solubilized iron from forming iron sulfide.

2. A method as set forth in claim 1 wherein said iron cyanide is a ferricyanide.

3. A method as set forth in claim 1 wherein said iron cyanide is a ferrocyanide.

4. A method as set forth in claim 1 wherein is included the step of maintaining at least about 50 ppm of said iron cyanide in the alkaline absorption medium.

5. A method as set forth in claim 4 wherein said iron cyanide is a sodium, potassium or ammonium salts of ferri or ferrocyanide.

6. A method as set forth in claim 1 wherein the ratio of boron to vanadium in said alkaline absorption medium on an elemental basis is from about 1 mole of boron to about 1 mole of vanadium to about 6 moles of boron to about 1 mole of vanadium.

7. A method as set forth in claim 1 wherein the quinone type oxidation catalyst is present in the alkaline absorption medium in the range of from about 50 ppm to about 6000 ppm.

8. A method as set forth in claim 7 wherein the oxidation catalyst is 1,4 dihydroxy quinone.

9. A method as set forth in claim 7 wherein the oxidation catalyst is 2,6 anthraquinone disulfonic acid.

10. A method as set forth in claim 7 wherein the oxidation catalyst is 2,7 anthraquinone disulfonic acid.

11. A method as set forth in claim 7 wherein the oxidation catalyst is a combination of 1,4 dihydroxy quinone and an isomer of anthraquinone disulfonic acid.

12. A method as set forth in claim 6 wherein the ratio of boron to vanadium is about 4.2 to 4.8 moles of boron for each mole of vanadium.

* * * * *